United States Patent
Pendleton et al.

(10) Patent No.: US 9,004,157 B2
(45) Date of Patent: Apr. 14, 2015

(54) BLOWOUT PREVENTER

(71) Applicants: Gary Pendleton, Gateshead (GB); Gary Stratulate, Houston, TX (US)

(72) Inventors: Gary Pendleton, Gateshead (GB); Gary Stratulate, Houston, TX (US)

(73) Assignee: Axon EP, Inc., Houston, TX (US)

( * ) Notice: Subject to any disclaimer, the term of this patent is extended or adjusted under 35 U.S.C. 154(b) by 0 days.

(21) Appl. No.: 13/631,175

(22) Filed: Sep. 28, 2012

(65) Prior Publication Data

US 2013/0026395 A1    Jan. 31, 2013

Related U.S. Application Data

(63) Continuation of application No. PCT/US2012/041544, filed on Jun. 8, 2012.

(60) Provisional application No. 61/494,518, filed on Jun. 8, 2011.

(51) Int. Cl.
   *E21B 33/06* (2006.01)

(52) U.S. Cl.
   CPC ............. *E21B 33/062* (2013.01); *E21B 33/063* (2013.01)

(58) Field of Classification Search
   CPC ............................ E21B 33/062; E21B 33/063
   USPC .............................. 251/1.1–1.3; 166/85.4, 55; 277/324–325
   See application file for complete search history.

(56) References Cited

U.S. PATENT DOCUMENTS

| | | | | | |
|---|---|---|---|---|---|
| 2,427,073 | A | * | 9/1947 | Schweitzer | 277/325 |
| 3,272,222 | A | * | 9/1966 | Allen | 137/315.02 |
| 4,052,995 | A | * | 10/1977 | Ellison | 137/1 |
| 4,076,208 | A | * | 2/1978 | Olson | 251/1.3 |
| 4,268,011 | A | * | 5/1981 | Randall | 254/29 A |
| 4,290,577 | A | * | 9/1981 | Olson | 251/1.3 |
| 4,437,643 | A | * | 3/1984 | Brakhage et al. | 251/1.3 |
| 4,799,696 | A | * | 1/1989 | Reed et al. | 279/50 |
| 4,840,346 | A | * | 6/1989 | Adnyana et al. | 251/1.3 |
| 5,025,708 | A | * | 6/1991 | Smith et al. | 92/19 |
| 5,056,418 | A | * | 10/1991 | Granger et al. | 92/24 |
| 7,195,224 | B2 | * | 3/2007 | Le | 251/1.3 |
| 7,367,396 | B2 | * | 5/2008 | Springett et al. | 166/298 |
| 8,479,825 | B2 | * | 7/2013 | Childers et al. | 166/360 |
| 2006/0076526 | A1 | * | 4/2006 | McWhorter et al. | 251/1.3 |
| 2009/0050828 | A1 | * | 2/2009 | Edwards | 251/1.3 |
| 2011/0012311 | A1 | * | 1/2011 | McClanahan | 277/327 |
| 2012/0193874 | A1 | * | 8/2012 | Melancon et al. | 277/314 |
| 2013/0313449 | A1 | * | 11/2013 | Weir et al. | 251/1.3 |

* cited by examiner

*Primary Examiner* — Giovanna Wright
(74) *Attorney, Agent, or Firm* — Baker Botts L.L.P.

(57) ABSTRACT

A blowout preventer comprising: a main body comprising a seal seating profile, one or more bonnet guideways, and one or more slide guideways; a bonnet attached to the main body, wherein the bonnet comprises one or more guide rods, a ram unit, and a seal seating profile; two retention units attached to the main body and the bonnet, wherein each retention unit comprise a clamp block, one or more guide rods, and a bonnet guideway; and a metal seal, wherein the metal seal is seated in the seal seating profile of the main body and the seal seating profile of the bonnet.

10 Claims, 9 Drawing Sheets

BLOWOUT PREVENTER

CROSS-REFERENCE TO RELATED APPLICATIONS

This application is a continuation of PCT/US12/41544, filed on Jun. 8, 2012, which claimed the benefit of U.S. Provisional Patent Application Ser. No. 61/494,518, filed on Jun. 8, 2011, the entire disclosures of which are hereby incorporated by reference.

BACKGROUND

Blowout preventers are used extensively throughout the oil and gas industry. Typical blowout preventers may comprise a main body to which are attached various types of ram units. The two categories of blowout preventers that are most prevalent are ram blowout preventers and annular blowout preventers. Blowout preventer stacks frequently utilize both types, typically with at least one annular blowout preventer stacked above several ram blowout preventers. The ram units in ram blowout preventers allow for both the shearing of the drill pipe and the sealing of the blowout preventer. Typically, a blowout preventer stack may be secured to a wellhead and may provide a safe means for sealing the well in the event of a system failure.

In a typical blowout preventer, a ram bonnet assembly may be bolted to the main body using a number of high tensile bolts or studs. These bolts are required to hold the bonnet in position to enable the sealing arrangements to work effectively. Typically an elastomeric sealing element is used between the ram bonnet and the main body. There are several configurations, but essentially they are all directed to preventing a leakage bypass between the mating faces of the ram bonnet and the main body.

During normal operation, the blowout preventers may be subject to pressures up to 20,000 psi, or even higher. These high pressures often place a severe loading the retaining bolts that are used to hold the ram units in position. Consequently a large number of bolts must be employed of sufficient size to contain the force in conventional blowout preventers. Maintenance of this large number of bolts is often a cumbersome process.

The high pressures also may affect the performance of the elastomeric sealing arrangements. These elastomeric seals can degrade over time and thus require scheduled maintenance. In order to perform this maintenance, the ram bonnet must be disassembled from the main body. Because of the large numbers of bolts, the disassembly and reassembly of the blowout preventers to maintain the elastomeric sealing arrangement may also be a cumbersome process.

Furthermore, elastomer seals are reliant upon clean and damage free mating surfaces. A slight scratch or nick in the mating surfaces could render the seal ineffective, resulting in leakage.

SUMMARY

The present disclosure relates to an improved blowout preventer. More particularly, in certain embodiments, the present disclosure relates to an improved blowout preventer comprising a metal-to-metal seal and other improvements.

In one embodiment, the present disclosure provides a blowout preventer comprising: a main body forming intersecting horizontal and vertical passageways extending through the main body wherein the horizontal passageway forms a ram location, the main body comprising a seal seating profile disposed on an outside surface of the main body around the ram location, one or more bonnet guideways disposed on the surface of the main body, and one or more slide guideways disposed on the surface of the main body; a bonnet attached to the main body, wherein the bonnet comprises one or more guide rods that engage the one or more bonnet guideways of the main body, a ram unit capable of seating in the ram location of the main body, and a seal seating profile disposed on a surface of the bonnet; two retention units attached to the main body and the bonnet, wherein each retention unit comprise a clamp block in engagement with the bonnet, one or more guide rods in engagement with the one or more slide guideways of the main body, and a bonnet guideway in engagement with the one or more guide rods of the bonnet; and a metal seal, wherein the metal seal is seated in the seal seating profile of the main body and the seal seating profile of the bonnet.

In another embodiment, the present disclosure provides a blowout preventer comprising: a main body forming intersecting horizontal and vertical passageways extending through the main body wherein the horizontal passageway forms a ram location, the main body comprising a seal seating profile disposed on an outside surface of the main body around the ram location; a bonnet attached to the main body, wherein the bonnet comprises a seal seating profile disposed on a surface of the bonnet and a ram unit that is capable of seating in the ram location of the main body; and a metal seal, wherein the metal seal is seated in the seal seating profile of the main body and the seal seating profile of the bonnet.

In another embodiment, the present disclosure provides a blowout preventer comprising: a main body forming intersecting horizontal and vertical passageways extending through the main body wherein the horizontal passageway forms a ram location and a bonnet attached to the main body, wherein the bonnet comprises a ram unit comprising a serrated shear blade, wherein the ram unit is capable of seating in the ram location of the main body.

In another embodiment, the present disclosure provides a blowout preventer comprising: a main body forming intersecting horizontal and vertical passageways extending through the main body; a first bonnet attached to a first side of the main body by means of one or more high load capacity fasteners, wherein the one or more high load capacity fasteners comprise a series of tappings; and a second bonnet attached to a second side of the main body by means of one or more high load capacity fasteners, wherein the one or more high load capacity fasteners comprise a series of tappings.

In another embodiment, the present disclosure provides a blowout preventer comprising: a main body forming intersecting horizontal and vertical passageways extending through the main body wherein the horizontal passageway forms a ram location and a bonnet attached to the main body, wherein the bonnet comprises a ram unit and an autolock device comprising a sprung loaded latch and a central lock spindle comprising a shoulder feature, wherein the ram unit is capable of seating in the ram location of the main body and wherein the sprung loaded latch of autolock device is capable of engaging the shoulder feature on the central lock spindle when the ram unit is in a closed position.

In another embodiment, the present disclosure provides a blowout preventer comprising: a main body forming intersecting horizontal and vertical passageways extending through the main body wherein the horizontal passageway forms a ram location and a bonnet attached to the main body, wherein the bonnet comprises a ram unit and a variable ram locking device comprising locking wedges and a central lock spindle comprising a tapered feature, wherein the ram unit is capable of seating in the ram location of the main body and wherein the locking wedges of the variable ram locking device are capable of engaging the tapered feature of central spindle when the ram unit is in a closed position, an open position, or a partially closed position.

The features and advantages of the present invention will be readily apparent to those skilled in the art. While numerous changes may be made by those skilled in the art, such changes are within the spirit of the invention.

BRIEF DESCRIPTION OF THE DRAWINGS

A more complete and thorough understanding of the present embodiments and advantages thereof may be acquired by referring to the following description taken in conjunction with the accompanying drawings.

DETAILED DESCRIPTION

The present disclosure relates to an improved blowout preventer. More particularly, in certain embodiments, the present disclosure relates to an improved blowout preventer comprising a metal-to-metal seal and other improvements.

There may be several potential advantages of the blowout preventers of the present disclosure. One of the many potential advantages of the blowout preventers of the present disclosure is that in certain embodiments they may allow for the formation of a high pressure seal while eliminating the need for bolting. Another potential advantage of the blowout preventers of the present disclosure is that in certain embodiments they may allow for a more robust sealing arrangement than conventional blowout preventers.

Figure 1:
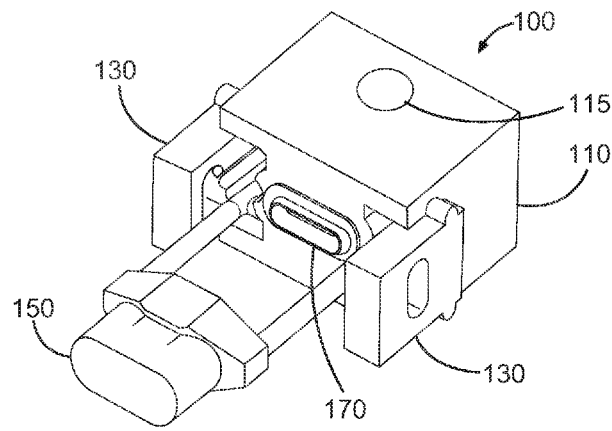
FIG. 1 is an illustration of a partially exploded view of an improved blowout preventer comprising a metal-to-metal seal in accordance with certain embodiments of the present disclosure.

In certain embodiments, the present disclosure provides a blowout preventer comprising a boltless bonnet retention and sealing system. As shown in FIG. 1, in certain embodiments, the blowout preventer 100 may comprise a main body 110, one or more retention units 130, one or more bonnets 150, and one or more metal seals 170.

Figure 2:
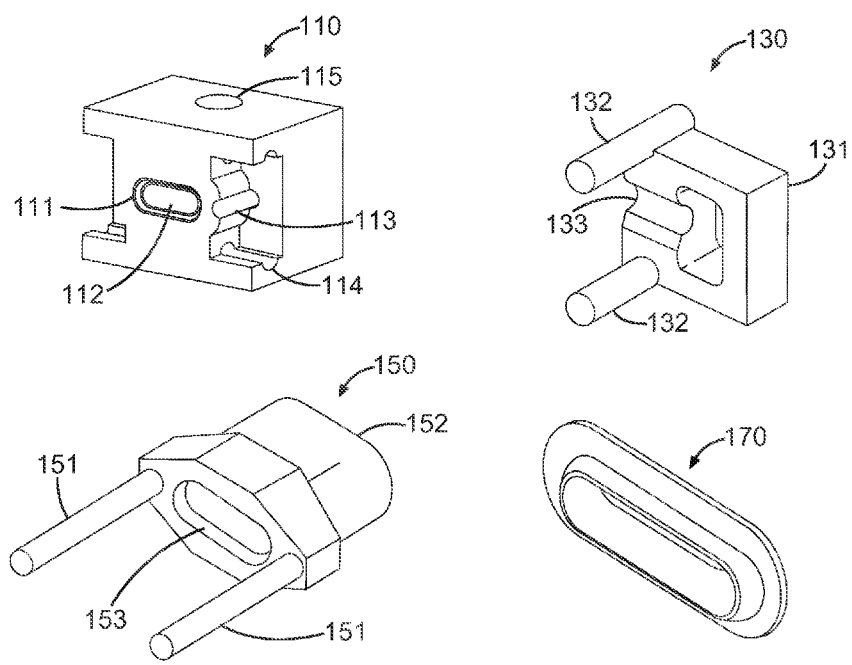
FIG. 2 is an illustration of a main body, a retention unit, a bonnet, and a metal seal in accordance with certain embodiments of the present disclosure.

In certain embodiments, the main body 110 may encompass all the operational features of a blowout preventer with regard to bore and ram feature operation. While conventional main bodies may comprise a bolt PCD (Pitch Circle Diameter), in certain embodiments alternative features may be in place to suit these operations. Such alternative features may include a slide guideway. FIG. 2 illustrates a main body 110 in accordance with one embodiment of the present disclosure. As can be seen in FIG. 2, the main body 110 may comprise a seal seating profile 111, a ram location 112, a bonnet guideway 113, one or more slide guideways 114, and bore 115. The slide guideway 114 may be configured to receive one or more retention units 130, such as slide units. The seal seating profile 111 may be configured to receive a metal seal 170. The ram location 112 may comprise an entrance to a horizontal passageway that intersects bore 115 and may be configured to receive a ram unit 152. The bonnet guideway 113 may be configured to receive one or more guide rods 151.

In certain embodiments, the retention unit 130 may be a hinge unit. In other embodiments, as shown in FIG. 2, the retention unit 130 may be a slide unit. As can be seen in FIG. 2, the retention unit 130 may comprise a clamp block 131, one or more guide rods 132, and a bonnet guideway 133. The retention unit 130 may be assembled to either side of the main body 110 as shown in FIG. 1. The clamp block 131 may be configured to restrain a bonnet 150 installed on the main body 110. The guide rods 132 may be configured to contact the slide guideways 114 of the main body 110 when the retention unit 130 is assembled to the main body 110. In certain embodiments, the retention unit 130 may comprise tapered mating surfaces.

In certain embodiments, bonnet 150 may be specifically designed to satisfy the operation requirements of the BOP with regard to operating pressure and design forces required. As can be seen in FIG. 2, the bonnet 150 may comprise one or more guide rods 151, a ram unit 152, and a seal seating profile 153. The bonnet 150 may be assembled to the main body 110 as shown in FIG. 1. In certain embodiments, the bonnet 150 may also comprise tapered mating surfaces.

In certain embodiments, as shown in FIG. 2, metal seal 170 may be of a wholly metal construction. In certain embodiments, as shown in FIG. 1, metal seal 170 and may be configured to seat in the seal seating profile 111 of the main body 110 and the seal seating profile 153 of the bonnet 150. In certain embodiments, the geometric profile of the metal seal 170 will match the geometric profile of the bonnet 150 and the main body 110. In certain embodiments, metal seal 170 may have tapered mating faces.

In certain embodiments, a blowout preventer 100 may comprise a main body 110, two retention units 130, a bonnet 150, and a metal seal 170 on the front side of the main body, and two retention units 130, a bonnet 150, and a metal seal 170 on the back side of the main body. In certain embodiments, each of the components of the blowout preventer 100 may be designed so that the blowout preventer 100 may be assembled as described below.

The main body 110 may be designed such that a portion of the metal seal 170 may seat in the seal seating profile 111 of the main body 110. When the bonnet 150 is attached to the main body 110, a portion of the metal seal 170 may also seat in the seal seating profile 153 of the bonnet 150. The bonnet 150 may be attached to the main body 110 by placing the guide rods 151 of the bonnet 150 into the bonnet guideways 113 of the main body 110. Once the bonnet 150 is attached to the main body 110, the retention units 130 may then be attached to the main body 110 by placing the guide rods 132 of the retention unit 130 into the slide guideways 114 of the main block 110. Once in place, the clamp blocks 131 of the retention units 130 may come into contact with the bonnet 150, and the tapered mating faces of the retention unit 130 may also come into contact with the tapered mating surfaces of the bonnet 150, preventing the bonnet 150 from being removed from the main body 110 without first removing the retention units 130.

In certain embodiments, the metal seal 170 may not fully seat in the seal seating profile 153 of the bonnet 150 and the seal seating profile 111 of the main body 110 when the bonnet 150 is attached to the main body 110. Initial sealing may be across contact points through a partial interference of the components during the final assembly whereby the bonnet 150 is clamped to the main body 110. For example, once the retention units 130 are engaged with the bonnet 150 across the relevant tapered mating surfaces, and the retention units 130 are driven towards each other, the force that is generated may be transferred to the metal seal 170, causing it to distort forming a pre loaded seal.

Figure 3:
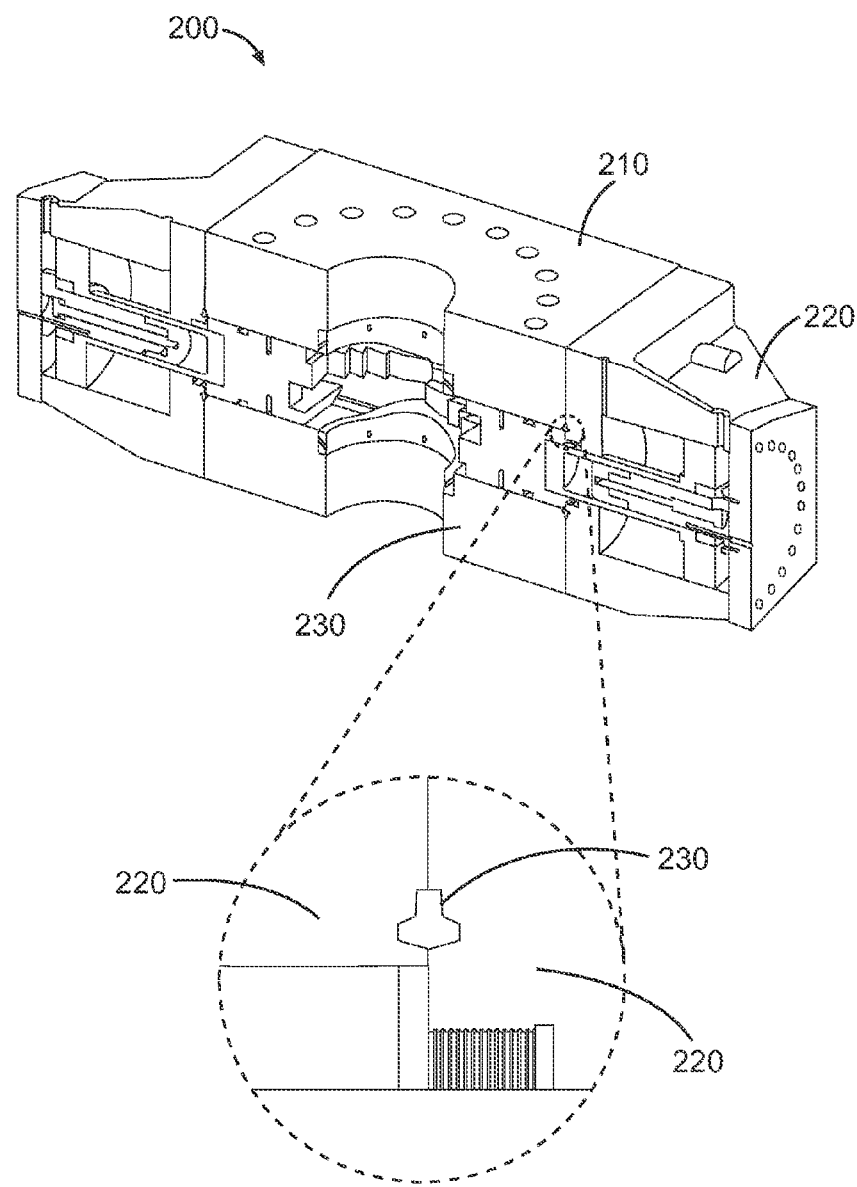
FIG. 3 is a partial view of an improved blowout preventer comprising a metal seal in accordance with certain embodiments of the present disclosure.

In other embodiments, the present disclosure provides a blowout preventer comprising a main body, a bonnet, and a metal to metal seal. FIG. 3 illustrates a blowout preventer 200 which comprises main body 210, bonnet 220, and metal seal 230.

During operation, pressure may be introduced into the bore cavity, generating internal forces. However, any movement that may occur because of these internal forces may be restricted via tie-rods and or retainers on the side of the blowout preventer. As further pressure develops, the metal seal may elastically deform, in effect forming a pressure energized seal. Additionally, as the metal seal elastically deforms, the internal pressure may push the portions of the metal seal further into the seal seating profiles of the main body and bonnet, thereby creating a pressure tight seal. Furthermore, if the internal pressure were to be released, the preformed seal would prevent the bonnet from reseating to its original state, thus maintaining the pressure seal. In certain embodiments, the blowout preventers discussed herein may be pressurized after initial assembly thereby forming a pre-loaded seal.

In addition to the above described joint make up, the particular design of the blowout presenter of the present disclosure also provides for the basis of a no bolt makeup solution. In addition, embodiments of the present disclosure may also include the use of smaller size bolts to pull the slide units into their operative positions. In certain embodiments, mechanic lead screws or hydraulic cylinders may be employed to position the elements of the blowout preventer into their operative positions. Due to the mechanical advantage of the tapered faces, small size or lower pressure cylinders may be sufficient to position the each of the elements. In certain embodiments, each of the elements of the blowout preventer may further comprise locking pins which enable the elements to be locked into their operative positions.

In certain embodiments, the present disclosure provides an improved blowout preventer comprising serrated shear blades. The serrated shear blades may be included any embodiment of the blowout preventers discussed herein. In a conventional blowout preventer, some of the energy used in the shearing operation is simply used to squash or flatten the casing before the blades eventually cut or shear the casing. Problems can be encountered with this type of shear if the drill pipe is offset to the centerline of the blowout preventer. Furthermore, if there is a wireline running through the casing, the wireline may not be cleanly sheared and some of the remaining wire strands stop the BOP from sealing. It has been discovered that utilizing a blowout preventer comprising ram units with serrated blades can minimize these issues.

Figure 4:
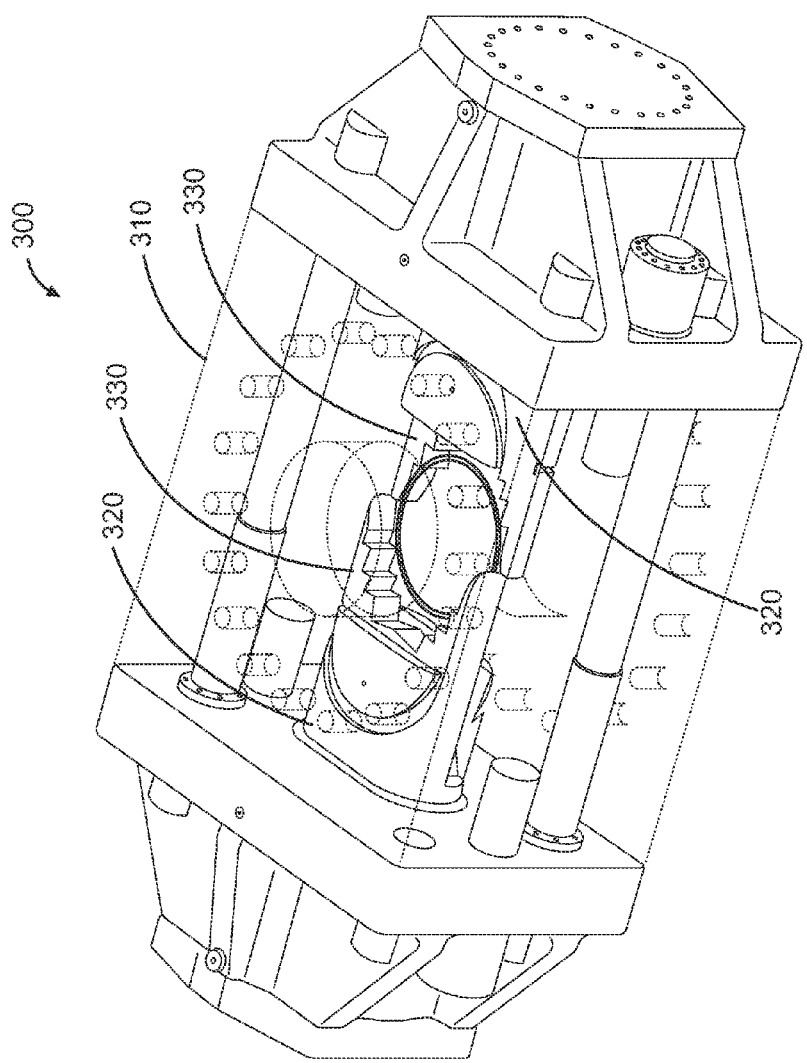
FIG. 4 is an illustration of an improved blowout preventer comprising serrated shear blades in accordance with certain embodiments of the present disclosure.
Figure 5A:
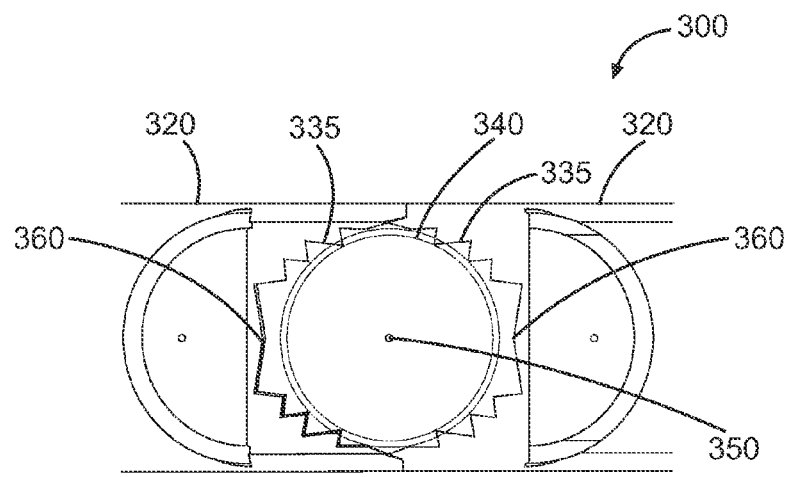
FIGS. 5A, 5B, 5C, and 5D are illustrations of the operation of serrated shear blades in accordance with certain embodiments of the present disclosure.
Figure 5B:
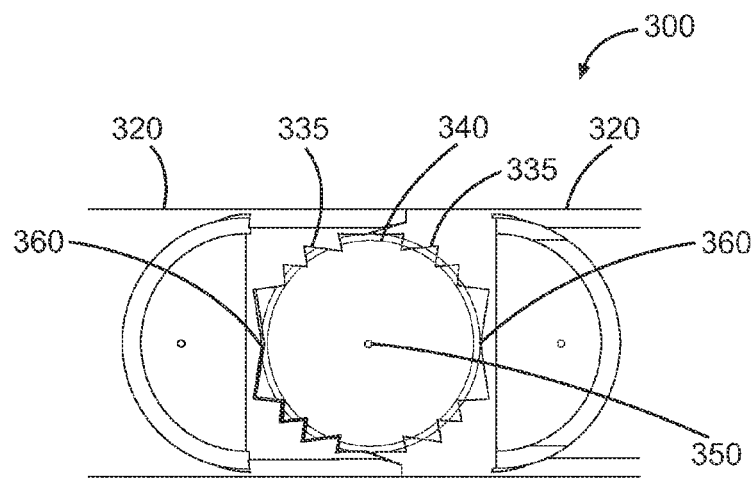
Figure 5C:
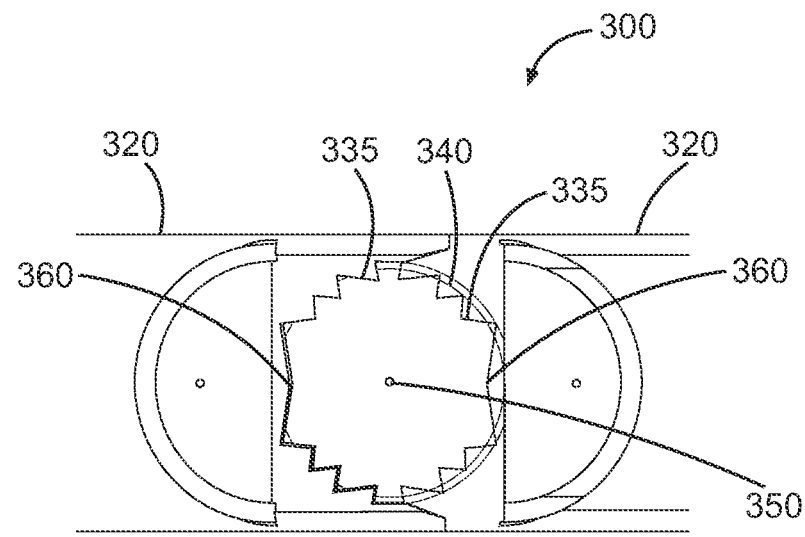

FIG. 4 illustrates a partially transparent view of blowout preventer 300 that comprises a main body 310, ram units 320, and serrated shear blades 330. FIGS. 5A, 5B, 5C, and 5D illustrate the operations of ram units 320 for blowout preventer 300. During operation serrated shear blades 330 may perform a number of functions to aid the centering and holding the casing or drill pipe while a shearing operation is performed. As shown in FIGS. 5A, 5B, and 5C, it can be observed the serrations 335 of ram units 320 initially contact the casing 340 toward the outer sides, first moving the casing 340 toward the centerline 350, and providing retention of the casing 340. It is the intention of the arrangement for the first set of serrations 335 to cut into the casing 340, thus holding the section in a more circular fashion providing a resistance to deformation of the casing 340.

As the serrations 335 engage the casing 340 the amount of material under shear load is considerably reduced. Continued operation of the rams units 320 toward the centerline 350 brings the casing 340 into contact with the second and third set of serrations 335, allowing each serration set to substantially shear through the casing 340 before the next serration set engages the casing 340, maintaining a low shear force.

A final profile 360 of the ram units 320 is then used to initially close up the casing onto any wireline which may be present providing a defined pocket into which the remaining structure can collapse. Further movement of the ram units 320 then provides a slight piercing action, in which the casing 340 is finally sheared.

Figure 5D:
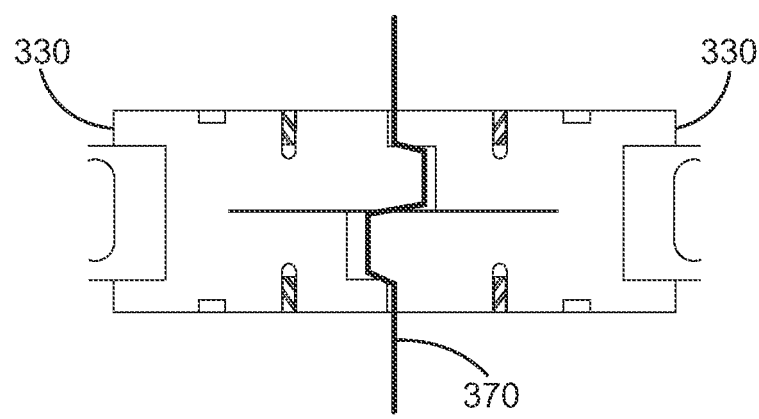

With regard to ensuring a clean shear through the wireline, the serrated blades may provide an intersecting arrangement, as shown in FIG. 5D. In certain embodiments the intersecting arrangement of serrated blades 330 may provide a means of gripping wireline 370 should wireline 370 start to flatten and the individual wire strands delaminate. Consequently serrated blades 330 may affect a clean break in wireline 370 by true shearing function or snapping.

Figure 6A:
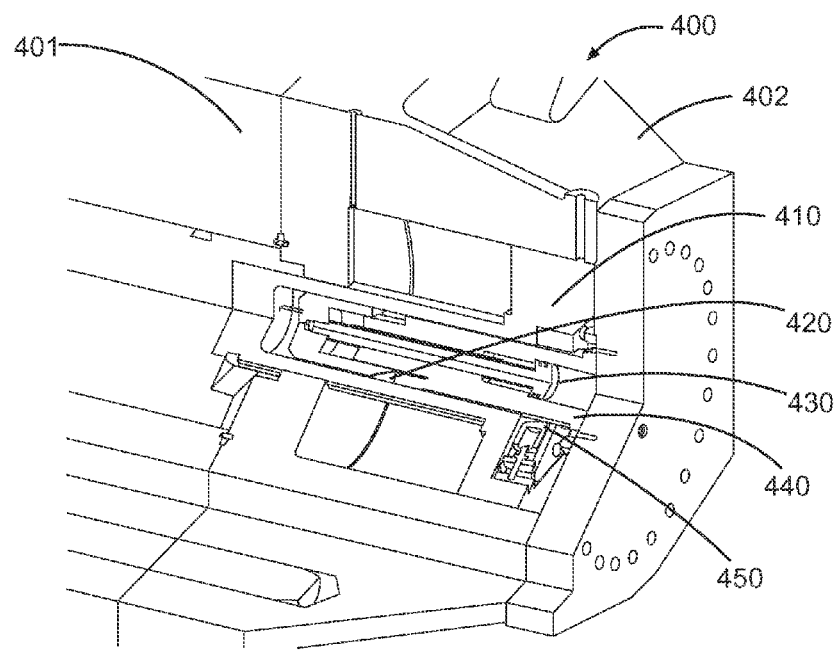
FIGS. 6A and 6B are partial views of illustrations of an improved blowout preventer comprising an autolock feature in accordance with certain embodiments of the present disclosure.
Figure 6B:
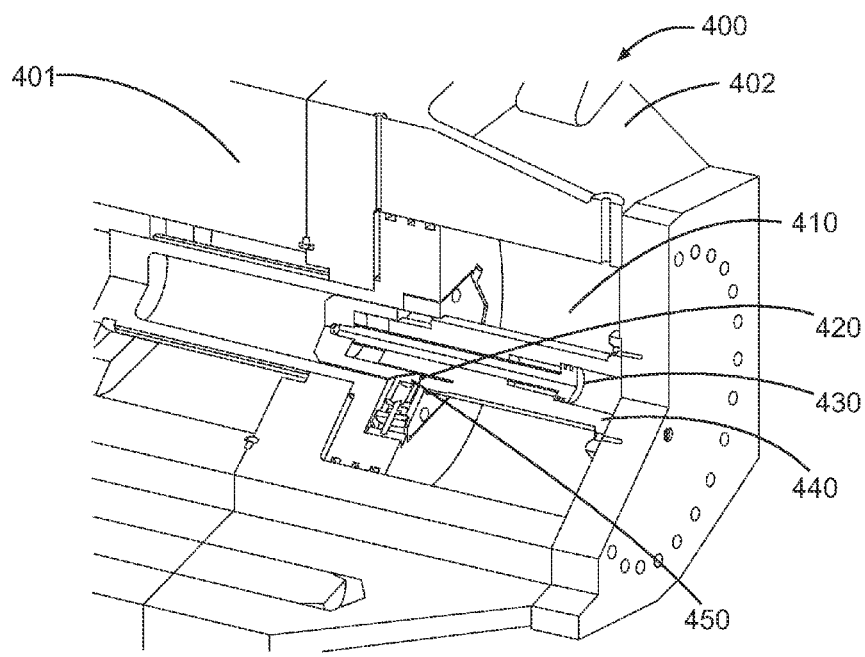

In certain embodiments, the present disclosure provides an improved blowout preventer comprising an autolock device. The autolock device may be utilized in any embodiment of the blowout preventers discussed herein, including blowout preventers with or without serrated shear blades. FIGS. 6A and 6B illustrate a partial view of blowout preventer 400 comprising main body 401 and bonnet 402 and further comprising an autolock device. As illustrated in FIGS. 6A and 6B, the autolock device may comprise a main actuator ram 410, a latch release cam 420, a latch release piston 430, a central lock spindle 440, and a sprung loaded latch 450. FIG. 6B illustrates the autolock device in the set position. When the main actuator ram 410 is operated, the sprung loaded latch 450 may be held in an open position due to the diameter of the central lock spindle 440. When the main actuator ram 410 draws to a closed position, the sprung loaded latch 450 may be pushed forward engaging a shoulder feature on central lock spindle 440. In this closed position, any force transmitted to the main actuator ram 410 may be transferred to the central lock spindle 440, preventing the refraction of the main actuator ram 410. Thus, the autolocking arrangement allows for the ram to be locked in place when the ram is in a closed position.

To release, a latch release piston 430 may be hydraulically activated allowing the main actuator ram 410 to retract when under hydraulic pressure.

Figure 7:
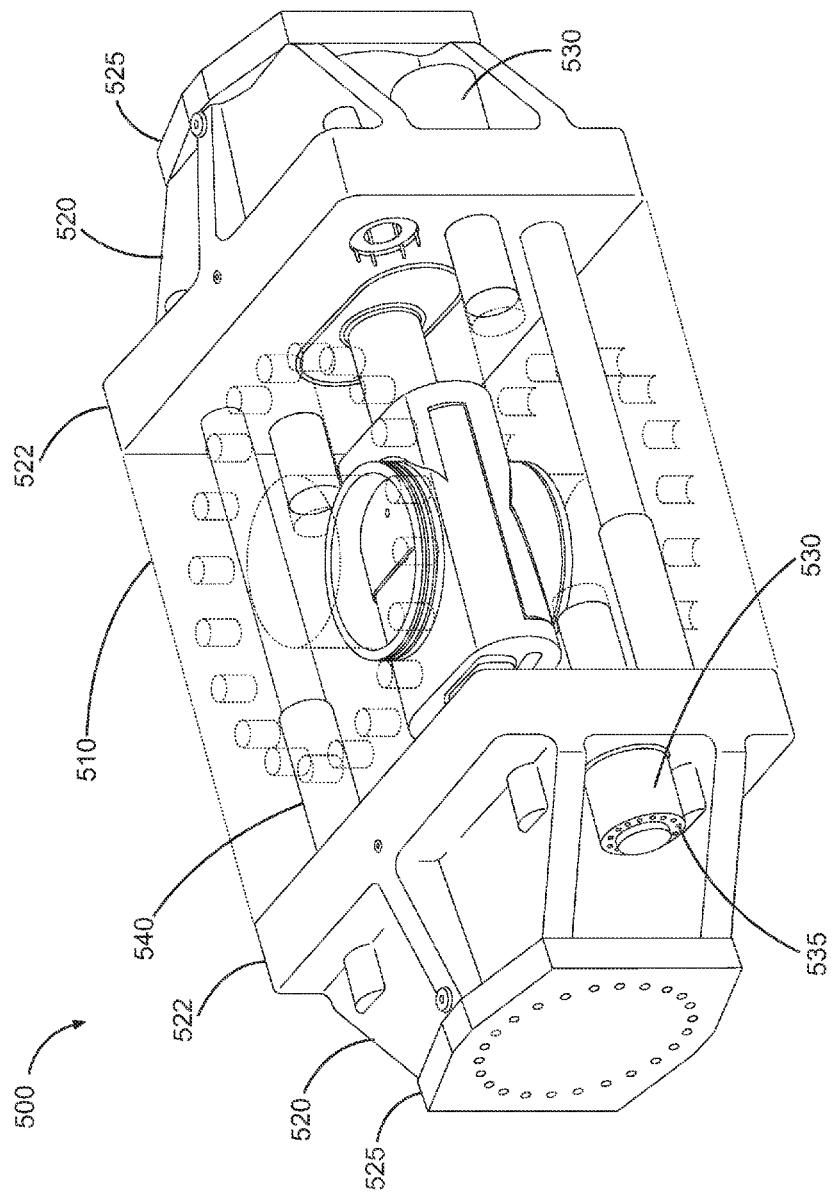
FIG. 7 is an illustration of an improved blowout comprising through guide bars and high load capacity fasteners in accordance with certain embodiments of the present disclosure.

In certain embodiments, the present disclosure an improved blowout preventer comprising revised bonnet. The revised bonnet may be utilized in any embodiment of the blowout preventers discussed herein, including blowout preventers with or without serrated shear blades and blowout preventers with or without autolock devices. In certain embodiments, the revised bonnet may comprise a thick flange. FIG. 7 illustrates a partially transparent view of blowout preventer 500 comprising a main body 510, two bonnets 520 comprising thick flanges 522 and bonnet lids 525, and packing nuts 530. In certain embodiments, the revised bonnet may provide a location for a packer gland type sealing, while the thickness of the flange provides resistance to deflection under loading. Combining these features into the main bonnet construction reduces the possibilities of leakage between the differing pressures. This construction allows for all the main operating elements to be housed within the bonnet with regard to assembly and maintenance. By removal of the bonnet lid, the operating components may quickly be accessed during assembly and subsequent maintenance.

In certain embodiments, as shown in FIG. 7, the present disclosure an improved blowout preventer comprising through guide bars 540. Through guide bars may be incorporated into any design discussed herein to allow the bonnets to be slid out and be supported by the guide bars. In certain embodiments, the through guide bars may be configured sufficiently long enough to engage the opposite bonnet. This arrangement may be used to apply a secondary visual indicator lock to show the bonnets have been correctly assembled.

In certain embodiments, the through guide bars may be simple diameter bars located within a bearing housing. In certain embodiments, the through guide bars may be configured as hydraulic rams, to enable hydraulic activation of the bonnet, or a mechanical arrangement, such as a rack and pinion styled drive, whereby the guide rods are configured as the racks.

In certain embodiments, the packing nuts 530 may comprise high load capacity fasteners. High capacity load fasteners may be incorporated into any design discussed herein. Historically, bonnets have been attached to the main body via a series of large bolts distributed around the bonnet. These bolts can be 3 or 4 inches in diameter, requiring specialist tooling to enable the bonnets to be held in place. Consequently these specialist tools are also required for release of the bolts to carry out general maintenance. In certain embodiments, as shown in FIG. 7, the packing nut that has an internal thread to match the thread detail of a stud connection in the main body. In certain embodiments, the packing nut may comprise a series of small tappings 535 that provide a location for set screws to be screwed into place. In certain embodiments, the small tappings 535 are located on a perimeter of the packing nut 530.

When set screws are placed into the small tappings 535, the set screws may engage the main body 510 and gradually be tightened to create a combined preload, which is equivalent to the torque required to tighten a conventional nut. As the torque required to tighten each set screw may be considerably less than the force required to generate the equivalent torque in a conventional nut, no specialist tooling may be required to tighten the high load capacity fastener. In certain embodiments, the above mentioned revised bonnet design can be used in combination with the above mentioned boltless bonnet design.

In certain embodiments, the present disclosure an improved blowout preventer comprising replaceable center seal facings. The replaceable center seal facings may be utilized in any embodiment of the blowout preventers discussed herein, including blowout preventers with or without serrated shear blades, blowout preventers with or without autolock devices, and blowout preventers with or without revised bonnet designs. During operational service of blowout preventers, the internal cavity in the main body is subject to corrosion and erosion. In certain areas of the blowout preventer, for example the sealing surfaces, this corrosion and erosion have a detrimental effect to the operation of the blowout preventer. In order to minimize the corrosion and erosion of the blowout preventer, the improved blowout preventers of the present invention may comprise a replaceable center sealing facing.

Figure 8:
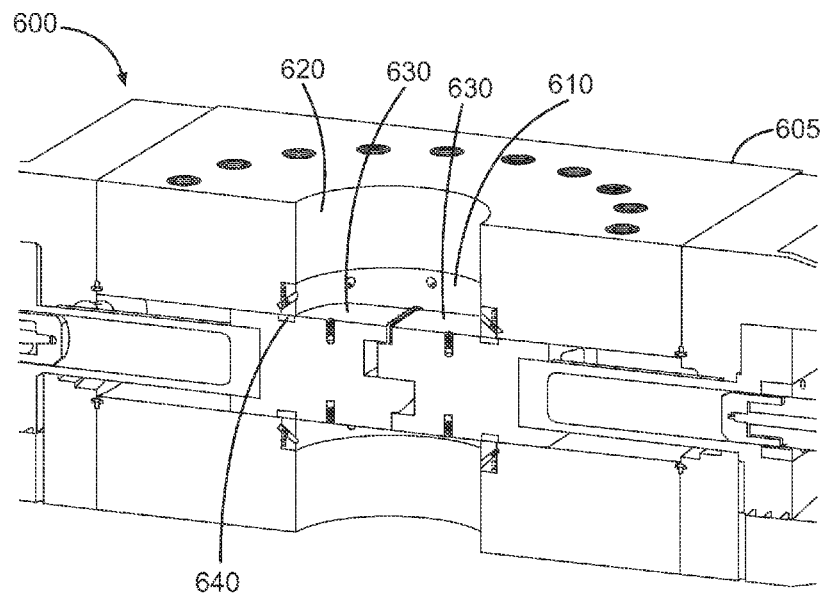
FIG. 8 is a partial view of an illustration of an improved blowout preventer comprising a replaceable center seal facing in accordance with certain embodiments of the present disclosure.

FIG. 8 illustrates a partial view of blowout preventer 600 comprising a replaceable seal facing 610 within an internal cavity 620 of the main body 605. In certain embodiments, the replaceable seal facing 610 may be made from corrosion resistant materials. In certain embodiments, the replaceable seal facing 610 may provide a sealing interface for the shear blade seals. As shown in 8, replaceable sealing facing 610 may be placed within the internal cavity 620 providing a sealing between the shear blades 630 and the internal cavity 620. In certain embodiments, when the shear blades are in a closed position, the replaceable seal facing 610 may project into a sliding bore 640 in which the shear blades 630 are housed. This feature may allow the replaceable seal facing to further compress providing a greater compact and thus a tighter seal. Due to the mechanical clearances of this arrangement, this allows for a general sealing during the stroking movement of the shear blade and once the shear blades are closed a tighter seal is formed.

Figure 9:
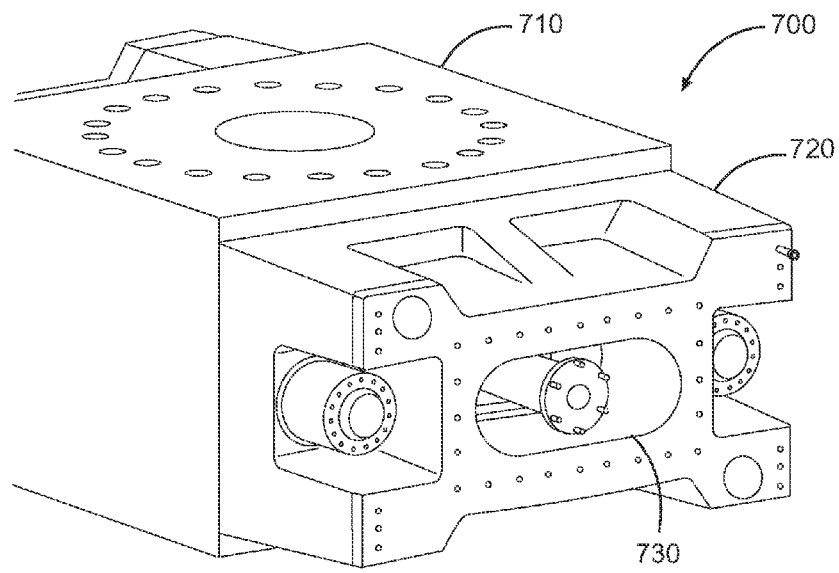
FIG. 9 is a partial view of an illustration of an improved blowout preventer comprising a non-circular geometry in accordance with certain embodiments of the present disclosure.

In certain embodiments, the improved blowout preventers of the present disclosure may comprise a geometric arrangement of the cylinder operator has been revised to non-circular shape, such as an oval shape. The revision of the profile to a non-circular arrangement is to generate a greater surface area on which the hydraulic fluid can operate, thus creating a greater actuation force for closing the rams. The bonnet design is not limited to either circular or oval profiles. The exact geometric requirement being based on the actuation forces required and the ease of manufacture of a profile to generate the forces required via the hydraulic pressure available. FIG. 9 illustrates a partial view of blowout preventer 700 comprising a main body 710 and a bonnet 720 with oval profiles 730. The non-circular arrangement may be utilized in any embodiment of the blowout preventers discussed herein, including blowout preventers with or without serrated shear blades, blowout preventers with or without autolock devices, blowout preventers with or without replaceable center seal facings, and blowout preventers with or without revised bonnet designs.

Figure 10:
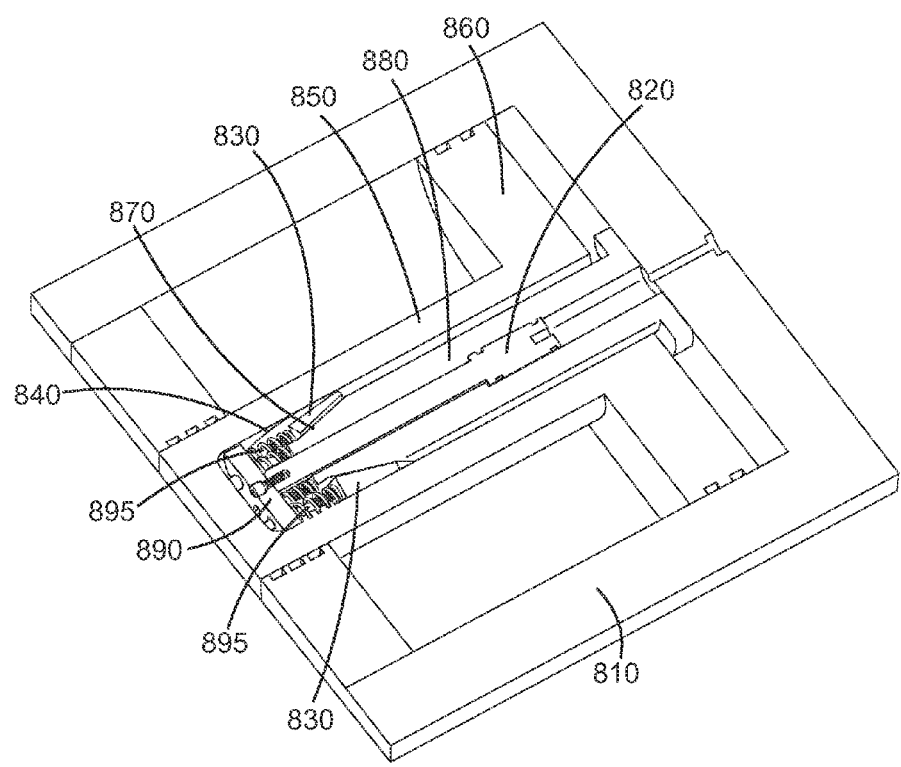
FIG. 10 is a partial view of an illustration of an improved blowout preventer comprising a variable ram position locking mechanism in accordance with certain embodiments of the present disclosure.

In certain embodiments, the improved blowout preventers of the present disclosure may comprise an variable ram locking arrangement. The variable ram locking arrangement may be utilized in any embodiment of the blowout preventers discussed herein, including blowout preventers with or without non-circular arrangements, blowout preventers with or without serrated shear blades, blowout preventers with or without autolock devices, blowout preventers with or without replaceable center seal facings, and blowout preventers with or without revised bonnet designs. This arrangement would be especially beneficial for use in variable ram bores comprising a deformable elastomer seal. FIG. 10 illustrates a partial view of an improved blowout preventer of the present disclosure comprising a variable ram locking arrangement.

As shown in FIG. 10, the variable ram locking arrangement may be designed such that as the shear blade of bonnet 810 moves from an open to a closed position, a bias is applied to a center ram 820 to constantly draw the locking wedges 830 into a position dictated by a tapered feature 840 in a center core 850 of the ram 860 and a tapered feature 870 on the central lock spindle 880. In this manner the locking wedge 830 may be permanently engaged with the tapered features 840 and 870, preventing the mechanism from being forced into the open position. As the shear blade travels from the open to closed position the relationship between the tapered areas may vary. However locking wedge 830 may constantly provide a locked taper detail. If a reverse force is applied from the shear blade, as the tapered surfaces 840 and 870 are already engaged on the locking wedge allow the mechanism immediately locks, preventing the shear blades from being retracted. Thus, the variable ram locking arrangement allows for the ram to be locked in place when the ram is in an open position, a closed position, or a partially closed position. To release the lock, pressure may be applied to the center ram 820. Wedge locater 890 and retention fasteners 895 may slip as the locking wedge 830 position moves, allowing constant contact to be made. In certain embodiments the retention fasters 895 may be a screw or spring arrangement connecting the wedge locator 890 to the locking wedges 830.

The blowout preventers of the present disclosure may have several advantages over the blowout preventers of the present art. The metal-to-metal seal created during assembly may be more robust than conventional seals. The use of internal pressure on the seal during operation may add to the sealing forces generated during the 'preload' construction to aid in sealing. The guide rods of the slide units may ensure proper alignment of each of the elements. The guide rods may act as shear pins during pressure operations. The tapered mating faces enable the elements to create the joint as well as provide a compliant arrangement to lock the elements in place. The blowout preventers of the present disclosure may not require large scale bolting and may allow for boltless construction. Various options exist to provide the various slide movements, such as bolting, leadscrews, or hydraulics. The self locking of the sealing mechanism may provide visual confirmation of the correct assembly of the blowout preventer of the present disclosure. Incorrect assembly, e.g. leaving a seal out, would make the assembly appear 'loose' with the key elements clearly not being in place. In certain embodiments, the construction can only be made up in one specific manner. Visual indicators may be added to confirm the construction, e.g. locking pins or latches, which may be designed to only be engaged if the joint is successfully made-up. The design of the blowout preventer is scalable to suit various bore sizes or pressure requirements. Servicing of the blowout preventer is dramatically simplified and may not require specialist equipment, such as high capacity torque wrenches.

Although the present invention and its advantages have been described in detail, it should be understood that various changes, substitutions and alternations can be made herein without departing from the spirit and scope of the invention as defined by the following claims.

What is claimed is:

1. A blowout preventer comprising:
   a main body forming intersecting horizontal and vertical passageways extending through the main body;
   a first bonnet attached to a first side of the main body by means of one or more high load capacity fasteners, wherein the one or more high load capacity fasteners comprise a series of tappings; and
   a second bonnet attached to a second side of the main body by means of one or more high load capacity fasteners, wherein the one or more high load capacity fasteners comprise a series of tappings;
   wherein the first and second bonnets comprise through guide bars, wherein the through guide bars of the first bonnet are capable of engaging the second bonnet and wherein the through guide bars of the second bonnet are capable of engaging the first bonnet.

2. The blowout preventer of claim 1, wherein each of the first and second bonnets comprise a thick flange.

3. The blowout preventer of claim 1, wherein each of the first and second bonnets comprise a bonnet lid.

4. The blowout preventer of claim 1, wherein the horizontal passageway is non-circular.

5. The blowout preventer of claim 1 further comprising a replaceable seal facing disposed within the vertical passageway of the main body.

6. The blowout preventer of claim 1, wherein:
   the horizontal passageway forms a ram location, the main body comprises a seal seating profile disposed on an outside surface of the main body around the ram location;
   the first bonnet comprises a seal seating profile disposed on a surface of the first bonnet and a ram unit that is capable of seating in the ram location of the main body; and
   the blowout prevent further comprises a metal seal, wherein the metal seal is seated in the seal seating profile of the main body and the seal seating profile of the first bonnet.

7. A blowout preventer comprising:
   a main body forming intersecting horizontal and vertical passageways extending through the main body wherein the horizontal passageway forms a ram location and
   a bonnet attached to the main body, wherein the bonnet comprises a ram unit comprising a serrated shear blade, wherein the ram unit is capable of seating in the ram location of the main body and wherein the serrated shear blade comprises at least one set of serrations and a final profile, wherein each set of serrations are positioned such that they engage and shear different sections of a drill pipe, and wherein the final profile comprises an inwardly extending projection extending toward a central axis of the vertical passageways extending through the main body, the inwardly extending projection being capable of closing off a drill pipe disposed in the vertical passageways prior to shearing a remaining section of the drill pipe via outwardly extending portions of the final profile.

8. The blowout preventer of claim 7 further comprising a metal seal, wherein the metal seal is seated in a seal seating profile disposed around the ram location of the main body and a seal seating profile disposed on a surface of the bonnet.

9. The blowout preventer of claim 7 further comprising a replaceable seal facing disposed within the vertical passageway of the main body, wherein the replaceable seal facing provides a sealing interface for the shear blade.

10. A blowout preventer comprising:
    a main body forming intersecting horizontal and vertical passageways extending through the main body wherein the horizontal passageway forms a ram location and
    a bonnet attached to the main body, wherein the bonnet comprises a ram unit and a variable ram locking device comprising:
    a central lock spindle having a tapered feature;
    a locking wedge; and
    a tapered feature formed in a center core of the ram unit;

wherein the ram unit is capable of seating in the ram location of the main body and wherein the locking wedge of the variable ram locking device is capable of engaging the tapered feature of the central spindle and the center core of the ram unit to lock the ram unit in a closed position, an open position, or a partially closed position.

\* \* \* \* \*